United States Patent [19]

Peters

[11] Patent Number: 4,718,067

[45] Date of Patent: Jan. 5, 1988

[54] DEVICE FOR CORRECTING AND CONCEALING ERRORS IN A DATA STREAM, AND VIDEO AND/OR AUDIO REPRODUCTION APPARATUS COMPRISING SUCH A DEVICE

[75] Inventor: Joseph H. Peters, Eindhoven, Netherlands

[73] Assignee: U.S. Philips Corporation, New York, N.Y.

[21] Appl. No.: 758,591

[22] Filed: Jul. 24, 1985

[30] Foreign Application Priority Data

Aug. 2, 1984 [NL] Netherlands .................... 8402411

[51] Int. Cl.[4] ............................................. G06F 11/10
[52] U.S. Cl. ..................................... 371/38; 358/336; 360/38.1; 371/31; 371/40
[58] Field of Search ................. 371/38, 39, 40, 31; 360/38.1, 47; 358/336

[56] References Cited

U.S. PATENT DOCUMENTS

| | | | |
|---|---|---|---|
| 4,146,099 | 3/1979 | Matsushima et al. | 371/31 X |
| 4,202,018 | 5/1980 | Stockham, Jr. | 360/47 |
| 4,380,069 | 4/1983 | Reitmeier et al. | 371/31 |
| 4,451,920 | 5/1984 | Hoshimi et al. | 371/40 |
| 4,453,250 | 6/1984 | Hoshimi et al. | 371/40 |
| 4,497,055 | 1/1985 | Hoshino et al. | 371/31 |
| 4,498,104 | 2/1985 | Schulz | 371/31 X |
| 4,517,600 | 5/1985 | Reitmeier | 358/336 X |
| 4,519,001 | 5/1985 | Morrison | 358/310 |
| 4,593,392 | 6/1986 | Kouyama | 371/31 |
| 4,605,966 | 8/1986 | Collins | 358/336 X |

Primary Examiner—Charles E. Atkinson
Attorney, Agent, or Firm—Thomas A. Briody; William J. Streeter; Gregory P. Gadson

[57] ABSTRACT

A device is described for correcting and concealing a data stream which is block-wise provided with redundancy. The redundancy has an error-correction capability per block. The blocks are received from a medium in a systematically distributed manner. After regrouping, error-signalling is formed per block by way of the error-correction code. For a number of successive blocks the total number of expected errors is compared with a threshold which lies within the error-correction capability of the code. When this threshold is exceeded, concealing takes place, even when the total maximum correction capability of the code has not yet been fully utilized.

7 Claims, 8 Drawing Figures

| RNDM | | SYNDR | | BR ST | |
|---|---|---|---|---|---|
| Nr | $P_R$ | Nr | CORR | $P_B$ | DEL |
| 0 | $\approx 1$ | 1 | * | $1/64$ | 0 |
| 1 | $\approx 1.2 * 10^{-3}$ | 12 | + | $12/64$ | 0 |
| 2 | $\approx 1.4 * 10^{-6}$ | 50 | □ | $50/64$ | 1 |
| 3 | $\approx 1.7 * 10^{-9}$ | 1 | — | $1/64$ | 1 |
| >3 | $\approx 2.0 * 10^{-12}$ | 0 | — | * | * |

| $BL_{-1}$ | 0 | 0 | 0 | 0 | 0 | 0 | 0 | 0 | 1 | 1 | 1 | 1 | 1 | 1 | 1 | 1 |
|---|---|---|---|---|---|---|---|---|---|---|---|---|---|---|---|---|
|   | 0 | 0 | 0 | 0 | 1 | 1 | 1 | 1 | 0 | 0 | 0 | 0 | 1 | 1 | 1 | 1 |
| $BL_1$ | 0 | 0 | 1 | 1 | 0 | 0 | 1 | 1 | 0 | 0 | 1 | 1 | 0 | 0 | 1 | 1 |
|   | 0 | 1 | 0 | 1 | 0 | 1 | 0 | 1 | 0 | 1 | 0 | 1 | 0 | 1 | 0 | 1 |
| $BL_0$ | ROM (1) ||||||||||||||||
| 0 0 | 0 | 0 | 0 | 0 | 0 | 0 | 1 | 1 | 0 | 1 | 1 | 1 | 0 | 1 | 1 | 1 |
| 0 1 | 0 | 0 | 1 | 1 | 0 | 1 | 1 | 1 | 1 | 1 | 1 | 1 | 1 | 1 | 1 | 1 |
| 1 0 | 0 | 1 | 1 | 1 | 1 | 1 | 1 | 1 | 1 | 1 | 1 | 1 | 1 | 1 | 1 | 1 |
| 1 1 | 1 | 1 | 1 | 1 | 1 | 1 | 1 | 1 | 1 | 1 | 1 | 1 | 1 | 1 | 1 | 1 |
|   | ROM (2) ||||||||||||||||
| 0 0 | 0 | 0 | 0 | 0 | 0 | 0 | 0 | 0 | 0 | 1 | 1 | 0 | 0 | 1 | 1 | 1 |
| 0 1 | 0 | 0 | 0 | 0 | 0 | 1 | 1 | 0 | 1 | 1 | 1 | 0 | 1 | 1 | 1 | 1 |
| 1 0 | 0 | 0 | 1 | 1 | 0 | 1 | 1 | 1 | 1 | 1 | 1 | 1 | 1 | 1 | 1 | 1 |
| 1 1 | 1 | 1 | 1 | 1 | 1 | 1 | 1 | 1 | 1 | 1 | 1 | 1 | 1 | 1 | 1 | 1 |

FIG.4

$$P_{mB} = \sum_{X_{-1} X_0 X_1} \overline{O}_c(X_{-1}, X_0, X_1) . P_B(X_{-1}) . P_B(X_0) . P_B(X_1)$$

$$P_{CR} = \sum_{X_{-1} X_0 X_1} O_c(X_{-1}, X_0, X_1) . P_R(X_{-1}) . P_R(X_0) . P_R(X_1)$$

FIG.5

DEVICE FOR CORRECTING AND CONCEALING ERRORS IN A DATA STREAM, AND VIDEO AND/OR AUDIO REPRODUCTION APPARATUS COMPRISING SUCH A DEVICE

BACKGROUND OF THE INVENTION

The invention relates to a device for correcting and concealing errors in a data stream which is organized in a succession of data blocks, each data block being converted into a code block consisting of code elements according to an error protection code having at least error-correcting properties by addition of redundancy, the code elements being received from a medium as being systematically distributed over an interval which corresponds to the length of several data blocks, said device comprising:

(a) an input device which includes a regrouping element for regrouping the code elements in code blocks;
(b) a correction device for reconstructing the associated data block from a regrouped code block while performing a correction, if possible and necessary, and forming a correction signalling;
(c) a concealing device for concealing, under the control of said correction signalling, a data element in order to prevent errors due to inadequacy of the error correction by replacing said data element by a supplementary data element; and
(d) an output device for converting the corrected or substitute data elements into a continuous signal stream. Such a device is known from U.S. Pat. No. 4,329,708. A signal which represents, for example an audio or video quantity, is first converted into a seires of data elements. A data element can be understood to mean a bit or a multi-bit symbol. Redundancy is added thereto in accordance with an error protection code having at least error-correcting properties. Many error-correcting codes are known—for example, Hamming codes for bit correction and Reed-Solomon codes for the correction of symbols. Also known are error-detecting codes—for example, codes involving cyclic checking of redundancy (CRC); moreover, many error-correcting codes also have error-detecting properties. The code blocks consist of code elements. A sub-class of codes, so-called systematic codes, enable division of the code elements into data elements (originating from the source) and added redundancy elements. This division is not possible in the case of non-systematic codes. In many codes code elements of a block are distributed over an interval of successive data blocks; this is also referred to as interleaving. Said medium may be a transmission link. It may alternatively be a storage medium such as a magnetically or optically readable disc, a magnetic tape or otherwise. For the recovery of the signal (whether for reproduction or not), the data elements must be decoded in data blocks, followed by reconversion into said signal.

Two categories of errors can occur during the described operation. First, there are random errors. These errors are a concern for every data element, and the chance of an error occuring is independent of the occurrence of an error in a neighboring data element. Such an error can be caused by electrical interference, by cosmic rays and the like. The chance of occurrence of an error, calculated per data element is usually much smaller than $10^{-3}$. Also known are so-called burst errors. This means that the chance of errors occurring in each element of a series of successive code elements originating from the medium during a time interval is high. Such an error can be caused, for example by a scratch on a magnetic tape. The error probability, calculated per code element, is then high; for a bit stream having an arbitrary content per bit it may be as high as a maximum of approximately 50%, and for multi-bit code elements, it may even be higher. The distribution of the code elements over an interval covering several data blocks allows for a reduced number of errors per code block upon decoding. This is usually also applicable when errors occur in the form of a burst. Prior to decoding the code elements must be regrouped so as to form the original code blocks again.

Upon decoding several situations are feasible:
(a) there are no errors so no further steps need be taken;
(b) there is an error and this error is not beyond the correction capability of the code, so that it can be corrected;
(c) there is an error which is beyond the correction capability of the code so that it cannot be corrected or not adequately corrected.

All three cases can be made known to the environment by way of correction signalling. In the case (c) two different possibilities exist:
(c1) the correction device signals the inadequacy of the correction capability;
(c2) this inadequacy is not signalled; an incorrect or inadequate correction may then take place, or the correction may be completely omitted.

In the case (c1), the concealing device becomes operative. Concealing can be performed by the addition of a supplementary code element. Implicitly a supplementary data element is thus also inserted. Direct insertion of the supplementary data element is also possible. The inserted element may have a fixed content; for example, in a two-dimensional picture it may be standard dark-grey. Another method consists of interpolation or substitution or the use of a filter. In all cases the substitute code element is constructed for one or more other data elements. Such concealing is generally suitable only when a given idea exists as regards the data content of the data elements to be ultimately reconstructed. For arbitrary series of data elements such concealing would usually be inadmissible.

It sill be apparent that the case (c2) is problematic. The invention is based on the idea that a positive correlation exists between the inadequacy of the correction capability for a given code block and a correction signalling in a neighboring code block which indicates that a disturbance, even if it is a correctable disturbance, is also present therein. The invention is also based on the recognition of the fact that on the one hand burst errors may give rise to disturbed states which can not be detected as such and which can thus cause incorrect correction. In given circumstances this may cause a disturbed reproduction of the original data, for example an acoustic "click". On the other hand, the invention is also based on the recognition of the fact that it is advantageous to utilize the correction capability of the code as fully as possible and to refrain from premature concealing because such concealing does not benefit the reproduction quality either.

SUMMARY OF THE INVENTION

It is an object of the invention to realize a suitable compromise between the inadequate correction of burst errors and the premature concealing of random errors. This object is achieved in that said concealing device responds to correction signals of a succession of code blocks so as to supplement a data element for a code block having a predetermined sequence number within said succession under the control of correction signalling which indicates a correct and completely realizable correction for the relevant code block when the total number of corrections to be performed within said succession exceeds a predetermined limit within the correction capability of the code.

Further attractive embodiments will be disclosed in the appended claims. The invention also relates to an audio and/or video reproduction apparatus comprising such a device.

BRIEF DESCRIPTION OF THE FIGURES

The invention will be described in detail hereinafter with reference to some Figures.

FIG. 4 shows contents of a control memory of the concealing device of the invention.

FIG. 5 shows some equations relating to the determination of the concealing strategy.

DESCRIPTION OF A EXEMPLARY EMBODIMENT

Figures 1, 2A, 2B, 3:
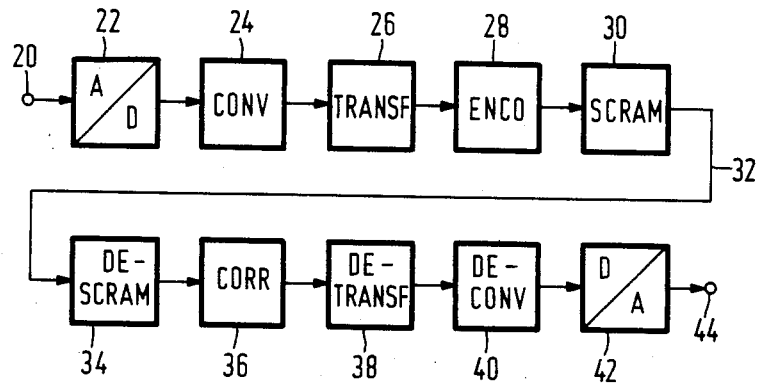
FIG. 1 shows a block diagram of an encoding and decoding device
FIGS. 2a and 2b show the generator matrix and the parity check matrix, respectively, of a code for which the invention can be used to good advantage.
FIG. 3 shows a table containing syndrome properties.

FIG. 1 shows an block diagram of an encoding and decoding device. Input 20 receives a continuous signal stream, for example an audio or a video signal stream. In element 22 this signal stream is converted into a series of digitized sampling values. In elements 24 and 26 this series is converted and transformed as will be described hereinafter. The already described data elements are thus produced. In element 28 redundancy is added in accordance with a code having at least certain error correcting capability. The element 28 thus outputs the code elements arranged in code blocks. In element 30 the code elements are systematically interleaved over blocks thus newly formed, and subsequently they are applied to a transmission channel (medium) 32. The description of the electrical or other adaptation of the signals to the channel 32 will be omitted for the sake of brevity. At the receiving end the code elements are regrouped in element 34 in order to reconstruct the original code blocks. If necessary and possible, any errors are corrected in element 36. In elements 38 and 40 the effects of the operations performed in the elements 24 and 26 are cancelled or compensated for by deconversion and de-interleaving. In element 42 the series of digitized sampling values is reconverted into a continuous signal stream, for example for reproduction on a display screen or by a loudspeaker. Such apparatus is to be connected to output 44.

A simple embodiment will now be described. In such a set-up, the elements 24, 26, 38, 40 are omitted. The code is, for example a word-wise organized Hamming code having a minimum code distance of three (in which case one bit error can be corrected per code word), for example, an (8, 12) code. The 12 code bits of a code word are then systematically distributed, for example, one code bit per newly formed transmission word. For example, the first code bit of a code word is not delayed, the second code bit is delayed by a period of time which corresponds to the duration of one code word, the third code bit is delayed by twice this period, and so on. These delays are compensated for at the receiving end. In the correction circuit 36 the number of bits to be corrected is enumerated over a running series of each time five code words: $i-2$, $i-1$, 1, $i+1$, $i+2$. When the total number of incorrect bits in these five words amounts to, for example at least three, it is assumed that the word having the sequence numer i is not correctable; in that case a concealing operation is performed, the concealing method itself will not be described for the sake of brevity. For the word $i+1$ etc. the same decision is then taken on the basis of the words $i-1$ ... $i+3$.

Similarly, use can be made of a code having a correction as well as a detection capability, for example an SEC-DED Hamming code (8, 13). When the number of errors in three successive code words ($i-1$, i, $i+1$) concerns at the most two correctable errors and no uncorrectable errors are indicated, the word i will be corrected, if necessary. When each of the three words contains one incorrect bit, concealing takes place. Concealing also takes place when one or more of the three words contains an uncorrectable error.

DESCRIPTION OF A PREFERRED EMBODIMENT

In a preferred embodiment, the signal stream on the input 20 in FIG. 1 contains video data. Each sampling value supplied by the block 22 contains the data of a so-called pixel and is 8 bits. These 8 bits represent color as well as brightness. The pixel data becomes available one picture line after the other and is applied to the conversion element 24. This element comprises a memory for the temporary storage of the pixel data. The data of a picture block of $4\times4$ pixels (=128 bits) is each time made available together on the output of the memory. The situation of these picture blocks with respect to one another is shown in FIG. 6a. Each successive picture block is thus situated so as to be shifted over one television line. This will not be elaborated herein. In the block 26 the data of such a picture block is transformed into the coefficients of two-dimensional Hadamard functions. The digital coefficients of the Hadamard functions are rounded off to a total of 42 bits, including 2 bits indicating which one of a plurality of codes is used. In the block 28 the 42 code bits are encoded, that is to say in such a manner that 36 bits are conducted without modification and six bits are conducted without modification and six bits are protected by (12, 6) code. The code will be described hereinafter; the entire system formed by the blocks 24, 26, 28 is described, partly by way of reference, in the previous Netherlands Patent Application 8105799, U.S. Ser. No. 451,685, now U.S. Pat. No. 4,555,729, in the name of Applicant, which Application is incorporated herein by way of reference. It is a special characteristic of this code that it enables a comparatively large number of errors to be corrected even when only a comparatively small amount of redundancy is added (6 bits); for given bits the minimum Hamming distance of the code equals 4 (SEC-DED system). For other bits this distance even equals 5 (two bit errors correctable). The latter means that, in spite of two bit errors, the relevant bits can be correctly recovered. On the other hand, the detection capability for errors within one code block (40 bits) is small when the correction capability is fully utilized.

FIG. 2a shows the generator matrix of the (12, 6) code used to encode a group of data bits. It will be apparent that the code is non-systematic, because more than six code bits (of the 12) are formed by a respective logic combination of more than one data bit.

FIG. 2b shows the respective parity check matric. As is known, always $[G] \times [H] = 0$. After encoding, the twelve code bits are systematically distributed over a corresponding number of code blocks. The first block receives all code bits having the sequence number 0, the second block receives all bits having the sequence number 1, and so on. Moreover, each code block also receives the non-protected bits of the corresponding block originating from the output of the encoder.

DESCRIPTION OF THE DECODING STRATEGY

During the decoding operation the distribution is first compensated for in the element 34. Subsequently, a code block is multiplied by the parity check matrix of the code so that the six-bit syndrome is formed. FIG. 3 shows a table containing the syndrome properties. The code is a linear type $2^6 = 64$ feasible syndrome patterns exist for each code block. Burst errors as well as random errors will be considered. First the random errors will be discussed. In the Figure it is assumed that the probability of a random error occurring per bit is $10^{-4}$. The first column indicates the number of single-bit (random) errors in a given code block within the section whereto the redundancy relates. The second column gives the chance that this error pattern occurs for the above error risk per bit. For 1 error, therefore, this is approximately $12 \times$ the chance of 1 given single-bit error. The chance of 2, 3 ... errors each time amounts to the $2^{nd}, 3^{rd}$ ... power of the chance of 1 error. The third column states the number of syndromes applicable to the relevant line in as far as the relevant syndrome was not already applicable to a previous line. The first line concerns 1 syndrome, the second line concerns 12 syndromes; in these cases complete correction is possible. The third line concerns 50 syndromes, but the number of feasible error patterns amounts to $12 \times 11 = 132$. The syndromes resulting therefrom may either be unique (in which case correction is possible) or coincide (in which case two or more correction bit groups are equally probable) or even coincide with one of the previously used 13 syndromes (in that case exact correction is not possible either). In these cases adequate correction is performed only for the two best-protected bits; for the other bits this correction will only be partly correct. The fourth line concerns the only remaining case which has not been found previously (the fourth line actually concerns $12 \times 11 \times 10 = 1320$ cases which is much more than the total number of syndromes available; most of these syndromes are identical to syndrome patterns found earlier). However, it is always assumed that a small number of errors is more likely to occur than a large number; this assumption creates the correction possibility in the case of the syndrome patterns of the first three lines. The fourth column states the error correction capability: not applicable, correct, partial and impossible, respectively. The fifth column concerns burst errors; the chance that a burst with an arbitrary bit result produces exactly the relevant syndrome. When a burst error occurs, the syndrome does not provide information as regards the actual situation. When the content of the data bits is arbitrary (the chance of "0" is just as high as the chance of "1") and the disturbance in the burst error is also arbitrary, all syndrome patterns are equally likely to occur. The chance in the fifth column is then always $1/64 \times$ the number in the third column. In principle, all syndrome patterns need not be equally probable; this will be discussed hereinafter. The sixth column of the Figure shows the detection possibility for a burst error in these cases when it is assumed that: correction is possible (lines 1, 2), which means that there is no burst. The chance is always in principle "0" or "1" (fifth line states "irrelevant"), depending on whether the relevant pattern is defined as being "caused by a burst error". In this case the chance of non-detection of a burst error thus amounts to 13/63, which is approximately 20%. This chance can be reduced (1/64) when all correction capability is abandoned, but even in that case a number of burst errors will still occur without being detected, while on the other hand all attractive correction properties of the error protection code are ignored.

As in the elementary embodiment, the solution is found by combining the results of successive code blocks. This is because the described distribution operation results in a pronounced correlation between the decoding results in successive code blocks when such a burst error occurs. A short burst error, for example, having a length in the vicinity of 48 bits, influences only one protected bit in each of the code blocks, so that the error can be treated as a random error. (The non-protected bits do not contribute to the syndrome patterns either.) However, long burst errors will disturb several code blocks to be successively treated by the decoder.

Good results are obtained by using the decoding results of three successive code blocks in order to decide whether the central one of the three need be concealed.

FIG. 4 shows the content of the control memory. Upon decoding, a two-bit result code is assigned to each first code block. This result code has the values decimal (0 ... 3), depending on whether the relevant syndrome occurs on line 1, 2, 3 or 4, respectively of the table. Thus, there are $2^6 = 64$ feasible combinations. $BL_{-1}$ in FIG. 4 shows the four feasible combinations for the preceding code block, $BL_1$ the four feasible combinations for the next code block, and $BL_0$ those for the current code block. The Figure shows two realizations. In both realizations the preceding block and the next block exert an influence in the same way. According to the first realization, concealing takes place if the sum of the codes of the three blocks equals at least "1 1" = 3 (decimal) while either at least the current block or at least both other blocks make a nonzero contribution thereto. In these cases the table ROM(1) of four rows and 16 columns contains a "1". A "0" means that concealing need not take place. According to the second realization, concealing generally takes place if either at least the current block has a code "1 1" or the sum of the codes amounts to at least the value 4 (decimal). Some exceptions are: current code 01, other codes 00/11, and current code 00, other codes 01/11; in these cases concealing does not take place either.

Both realizations represent a compromise between the probability $P_{mB}$ of "missing" a burst error and the probability $P_{cR}$ of premature concealing in the case of isolated bit errors. FIG. 5 provides an expression for these two probabilities. In these formulas a summing operation is performed over the three successive blocks. Therein, $0_C$ is the value of the control bit as present in FIG. 3, $P_B$ is the probability for a burst error (relating to one bit) and $P_R$ the probability for a random error (again relating to one bit).

When the probability for a random bit error equals $P_R = 10^{-4}$ (per bit), the following is found for the first realization:

$P_{mB} = 1/422$; $P_{cR} = 1.2 \times 10^{-8}$.

For the second realization:

$P_{mB} = 1/44$; $P_{cR} = 1.2 \times 10^{-11}$.

These probabilities must be multiplied by the number of burst errors ($P_{mB}$) per unit time and the bit rate ($P_{cR}$) in order to determine the probabilites per unit of time. Furthermore, a compromise must be found between the objection of a missed burst and premature concealing. The latter may depend on the nature of the data. For example, concealing will not be so objectionable in the case of a video film but will be more objectionable for the reproduction of digitally encoded texts.

It is also to be noted that a burst error need not always produce an arbitrary pattern comprising an equal number of zeroes and ones. It may be that a burst error produces a series of zeroes in the receiver, which will be unduly recognized as a stream of correct code words. If this problem is actually liable to occur, it can be solved by adding a suitable fixed 12-bit word modulo-2 to the 12-bit code words in the transmitter as well as the receiver.

The invention can be realized in various ways. The number of code blocks taken into account for the decision may be larger or smaller. The decision can be taken for a number of successive code blocks together. Notably when more than three code blocks are considered, all code blocks outside the current code block need not be equally important. A directly adjacent code block will usually be considered more important than a code block which is situated further away in the succession.

BLOCK DIAGRAM OF A DEVICE FOR USE IN A REPRODUCTION APPARATUS

Figure 6:
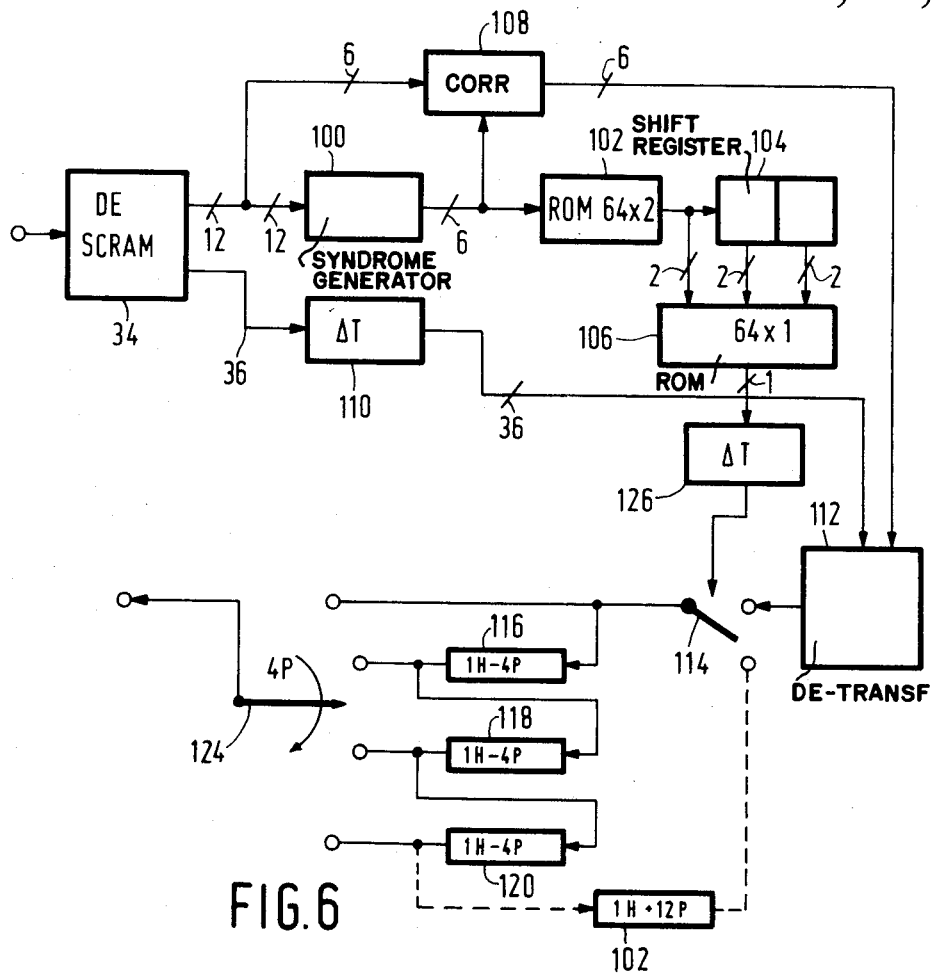
FIG. 6 shows a block diagram of a correction device and a concealing device.
Figure 6A:
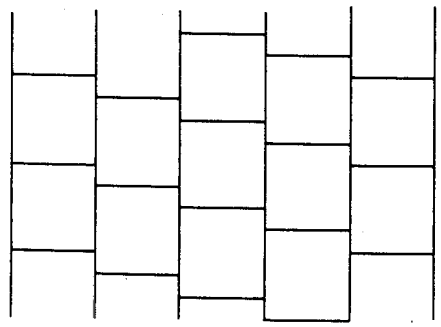
FIG. 6a shows a detail of the organization of a television picture.

FIG. 6 shows a block diagram of a correction device and a concealing device for use notably in a reproduction apparatus, that is to say for a television picture. The element 34 has already been described with reference to FIG. 1 and further. This element outputs the 12-bit code blocks plus the 36 non-protected bits. Element 100 is the syndrome generator; therein, the 12 code bits are multiplied by the parity check matrix in order to form a six-bit syndrome pattern. Element 102 is a read-only memory having a capacity of 64 2-bit words for the conversion of the syndrome patterns into a two-bit code, which code indicates the line in FIG. 4. Element 104 is a shift register having a capacity of two 2-bit words which is driven at the pixel frequency divided by 16. Element 106 is a read-only memory having a capacity of 64 1-bit words for implementing the table of FIG. 4. The output of this memory has a width of 1 bit. Element 108 is the correction element proper in which the actual correction is performed in accordance with the cited Patent Application so as to obtain data having a width of six bits. Element 110 is a delay element for presenting the 36 nonprotected bits to the element 112, together with the associated 6 reconstructed data bits. The element 112 corresponds to the already described element 38. It is alternatively possible to perform the concealing operation already before back-transformation and decoding. The serialized data appear on the output of element 112. In normal circumstances the switch 114 in the upper position. The series connection of the elements 116, 118, 120, 122 then forms a delay line having a length corresponding to 4 television lines; 1H is exactly one of those television lines: 1P represents the time interval between two successive pixels on one picture line; 4P and 12P, therefore, are 4× and 12× longer, respectively. The switch 124 is advanced by one position every pixel period. The two-dimensionally organized video data is thus converted into one-dimensionally organized data. Actually, the arrangement of three delay lines corresponds to the element 40 in FIG. 1. Due to the specific construction of the elements 116, 118, 120 adaptation to the picture organization of FIG. 6a is obtained and only a comparatively small amount of storage space will be required. Element 126 is a further delay element which introduces such an amount of delay with respect to any data to be concealed as supplied by the element 112, that the conceal control signal can operate the switch 114 at the instant at which the data to be concealed appears. Concealing takes place in that the data of a block of 4×4 pixels is replaced by the data of the next-higher block in the picture. In the case of concealing, the switch 114 is set to the lower position so that the data delayed over 4 lines is supplemented for some time.

The output of the switch 124 can be connected to a display section of a normal television display apparatus. The latter will not be elaborated upon herein for the sake of brevity.

What is claimed is:

1. A device for correcting and concealing errors in a data stream which is organized in a succession of data blocks, each data block being converted into a code block consisting of code elements which are grouped according to an error protection code having at least error-correcting properties by addition of redundancy, the code elements being received from a medium as being systematically distributed over an interval which corresponds to the length of several data blocks, said device comprising:
   (a) an input means which includes a regrouping element for regrouping the code elements in code blocks;
   (b) a correction means coupled to said input means for reconstructing the associated data block from a regrouped code block while performing a correction, and forming a correction signal via a correction means signal output;
   (c) a concealing means for concealing, under the control of said correction signalling received by said correction means from said correction means signal output, a data element by replacing said data element with a supplementary data element; and
   (d) an output means coupled to outputs of said correction means and said concealing means for converting the corrected or substitute data elements into a continuous signal stream, wherein said concealing means supplements a data element for a code block having a predetermined sequence number within a succession of code blocks when the total number of corrections to be performed within said succession exceeds a predetermined limit corresponding to a maximum number of corrections capable utilizing said code, said concealing means remains inactive below said predetermined limit, and said correction means applies a corrected data element to the output device below said predetermined limit.

2. A device as claimed in claim 1, wherein a supplementary data element is formed for one data block on the basis of a data element which belongs to another data block but which data element otherwise corresponds to a data element to be concealed.

3. A device as claimed in claim 1, wherein when the error protection code protects only a part of the data elements of a data block, supplementary data elements can also be formed for data elements outside said part.

4. A device as claimed in any one of the claims 1 to 3, wherein the error-protection code has a minimum Hamming distance for given data element within 2 data blocks which deviates from that for other data elements.

5. A device as claimed in any one of the claims 1 to 3, further comprising a processing element for adding a standard word to a code block so as to enable detection of uniformly monovalent code blocks.

6. A video reproduction apparatus comprising a device as claimed in any one of the claims 1 to 3.

7. An audio reproduction apparatus comprising a device as claimed in any one of the claims 1 to 3.

* * * * *